US012537321B2

(12) United States Patent
Rasalingam

(10) Patent No.: US 12,537,321 B2
(45) Date of Patent: Jan. 27, 2026

(54) CONNECTOR FOR AN ELECTRONIC DEVICE HAVING A GRID OF CONNECTION POINTS

(71) Applicant: Sandisk Technologies, Inc., Milpitas, CA (US)

(72) Inventor: Uthayarajan A/L Rasalingam, Penang (MY)

(73) Assignee: Sandisk Technologies, Inc., Milpitas, CA (US)

( * ) Notice: Subject to any disclaimer, the term of this patent is extended or adjusted under 35 U.S.C. 154(b) by 550 days.

(21) Appl. No.: 17/740,836

(22) Filed: May 10, 2022

(65) Prior Publication Data

US 2023/0369791 A1 Nov. 16, 2023

(51) Int. Cl.

| | |
|---|---|
| ***H01R 12/57*** | (2011.01) |
| ***H01R 12/52*** | (2011.01) |
| *H01R 24/60* | (2011.01) |
| *H01R 107/00* | (2006.01) |

(52) U.S. Cl.

CPC ............. *H01R 12/57* (2013.01); *H01R 12/52* (2013.01); *H01R 24/60* (2013.01); *H01R 2107/00* (2013.01)

(58) Field of Classification Search

CPC .. H01R 12/721; H01R 12/724; H01R 12/707; H01R 12/526; H01R 43/0256; H01R 24/60; H01R 12/51; H01R 12/79; H01R 43/205; H01R 12/57; H01R 12/52

See application file for complete search history.

(56) References Cited

U.S. PATENT DOCUMENTS

| | | | | |
|---|---|---|---|---|
| 5,895,281 | A * | 4/1999 | Rothenberger | H01R 12/83 439/83 |
| 7,794,259 | B2 | 9/2010 | Zhu et al. | |
| 2014/0273552 | A1* | 9/2014 | Ganesan | H05K 1/147 439/65 |
| 2019/0215964 | A1* | 7/2019 | Long | H05K 3/34 |
| 2021/0044060 | A1* | 2/2021 | Wu | H01R 12/725 |
| 2021/0203094 | A1 | 7/2021 | Li et al. | |
| 2021/0305211 | A1* | 9/2021 | Jensen | H01L 25/0657 |

* cited by examiner

*Primary Examiner* — Tulsidas C Patel
*Assistant Examiner* — Carlos E Lopez-Pagan
(74) *Attorney, Agent, or Firm* — DENTONS Durham Jones Pinegar

(57) ABSTRACT

A connector for communicatively coupling an electronic device to a host device is provided. The connector includes a mating side and a termination side for surface mounting the connector to the electronic device. The mating side includes a first contact and a second contact. The termination side includes a printed circuit board and a grid of connection points provided on a bottom surface of the printed circuit board. The first contact is communicatively coupled to a first connection point in the grid of connection points and the second contact is communicatively coupled to a second connection point in the grid of connection points.

20 Claims, 7 Drawing Sheets

CONNECTOR FOR AN ELECTRONIC DEVICE HAVING A GRID OF CONNECTION POINTS

BACKGROUND

A data storage device, such as a non-volatile storage device, typically includes a connector that connects the data storage device to a host device. For example, a solid state drive (SSD) may use a small form factor (SFF) connector to interface with a Peripheral Component Interconnect Express (PCIe) bus on a motherboard of a host device. The SFF connector includes gold finger contacts on a mating side that are electrically coupled to various pins on a termination side. The gold finger contacts and pins enable signals to be exchanged between the host device and the SSD.

As technology continues to improve, the number of signals exchanged between the host device and the SSD continues to increase. In order to handle the increase in signals, additional gold finger contacts and/or pins may be added to the SFF connector. In order to make room for additional pins, the pins must be made smaller/thinner and/or placed closer together (e.g., the connector must have a higher pin density). However, smaller/thinner pins may be more easily damaged. Additionally, when pins are placed closer together, the risk of a solder bridge forming between adjacent pins increases.

Accordingly, it would be advantageous for a connector to have multiple connection points that enable various signals to be exchanged between devices while avoiding the drawbacks of high pin density.

SUMMARY

The present application describes a connector for communicatively coupling an electronic device and/or a computing component to a host device. In an example, the electronic device and/or the computing component may be a data storage device such as, for example, a non-volatile storage device (e.g., a solid state drive (SSD)) or other data storage device. Although a data storage device is specifically mentioned, the connector described herein may be used to communicatively couple various computing components and/or electronic devices to a host device.

The connector described herein includes a mating side and a termination side. The mating side includes a number of contacts (e.g., gold finger contacts) that are communicatively coupled to a grid of connection points on the termination side. The grid of connection points includes one or more rows and columns. In an example, the grid of connection points is a ball grid array (BGA) that enables the termination side of the connector to be surface mounted to a printed circuit board of the electronic device.

Accordingly, the present application describes a connector for communicatively coupling an electronic device to a host device. In an example, the connector includes a mating side comprising a first contact and a second contact. The connector also includes a termination side for surface mounting the connector to the electronic device. The termination side includes a printed circuit board and a grid of connection points provided on a bottom surface of the printed circuit board. In an example, the first connection point of the grid of connection points is communicatively coupled to the first contact and a second connection point of the grid of connection points is communicatively coupled to the second contact.

The present application also describes a connector for communicatively coupling an electronic device to a host device. The connector includes a mating side comprising a plurality of contacts and a termination side for surface mounting the connector to the electronic device. The termination side includes a grid of connection points provided on a bottom surface of a printed circuit board. In an example, each of the plurality of contacts are communicatively coupled to a particular area in the grid of connection points based, at least in part, on a type of signal associated with each of the plurality of contacts.

Also described is a connector for communicatively coupling an electronic device to a host device. The connector includes a mating side having a plurality of contact means and a termination side for surface mounting the connector to the computing component. The termination side includes a grid of connection means provided on a bottom surface of a printed circuit board. In an example, each of the plurality of contact means are communicatively coupled to respective connection means in the grid of connection means.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
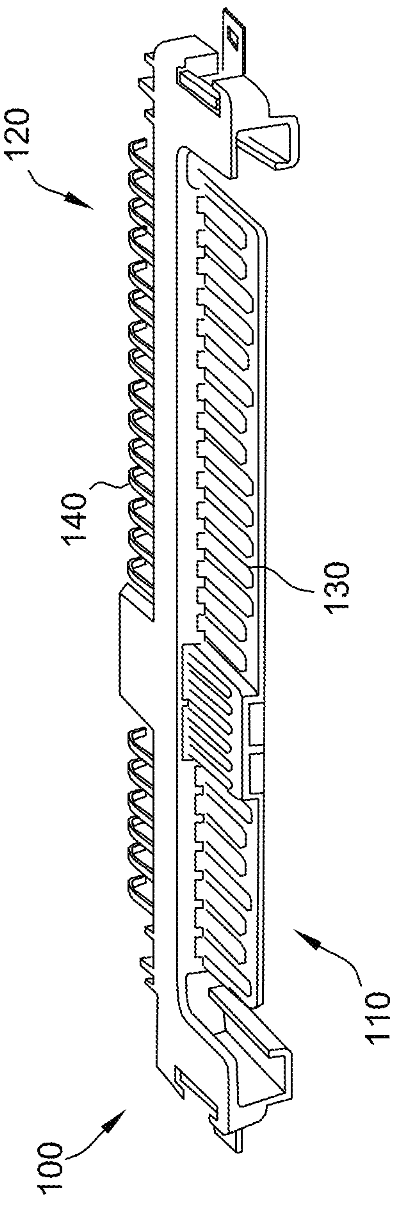
FIG. 1 (Prior Art)
FIG. 1 illustrates a conventional connector that may be used to communicatively coupled a data storage device to a host device.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

An electronic device, such as, for example, a data storage device, typically includes a connector that enables the electronic device to be communicatively coupled or otherwise connected to a host device. For example, a data storage device (e.g., a SSD) may include a small form factor (SFF) connector having a number of gold finger contacts on a mating side of the connector and corresponding pins on a termination side of the connector. Typically, the pins are communicatively coupled (e.g., soldered) to a printed circuit board of the data storage device while the gold finger contacts are used to mate the data storage device with a corresponding interface (e.g., a Peripheral Component Interconnect Express (PCIe) interface) on a motherboard of a host device. As such, various signals and/or commands may be exchanged between the host device and the data storage device.

In some cases, it may be desirable to increase the number of signals and/or commands that are exchanged between the host device and the data storage device. In order to increase the number of signals exchanged, additional gold finger contacts and associated pins must be added to the connector.

In some cases, it may be relatively easy to add additional gold finger contacts to the connector. However, it is difficult to add additional pins to the connector as the pins would need to be made smaller, thinner, and/or would need to be placed closer together. The pins on the connector are typically exposed. As the pins get smaller and thinner, the pins are more easily damaged. Additionally, when the pins are coupled (e.g., soldered) to printed circuit board of the electronic device, the risk of solder bridges forming between adjacent pins significantly increases.

In order to address the above, the present application describes a connector for an electronic device. The connector includes a mating side and a termination side. The mating side has a number of contacts (e.g., gold finger contacts) and each of the contacts are communicatively and/or electrically coupled to various connection points on the termination side. In an example, the connection points are arranged in a grid of rows and columns. For example, the grid of connection points may be solder balls that are part of a ball grid array (BGA). As additional contacts are added to the connector, additional rows and/or columns of connection points may be added to the termination side.

The connection points may be provided on a bottom surface of a printed circuit board coupled to or otherwise associated with the connector. The connection points on the bottom surface of the printed circuit board enable the connector to be surface mounted to a printed circuit board of the electronic device.

The connector may also include a housing. The printed circuit board on which the connection points are placed may be at least partially contained in the housing. For example, a top surface of the printed circuit board may be contained within the housing while the bottom surface (e.g., the surface having the grid of connection points) is exposed.

In some examples, a connection mechanism is provided or otherwise disposed between each contact and each connection point. In one example, the connection mechanism is a pin. In order to protect the connection mechanism from being damaged, the connection mechanism may also be contained in the housing.

A trace may be used to electrically couple each connection mechanism and/or each contact to corresponding connection points in the grid of connection points. In some examples, at least a portion of each trace may be provided in and/or otherwise routed on the printed circuit board on which the grid of connection points is provided. In another example, each trace may be directly coupled to a particular connection point in the grid of connection points. Because traces are used to connect the contacts with the connection points, a contact may be connected to any location/connection point in the grid of connection points. For example, signals of various types (e.g., power/ground, commands, data) and/or connection types (e.g., SAS, SATA) may be routed to different areas in the grid of connection points.

Accordingly, the present application describes a number of technical benefits. In particular, the implementation of the connector described herein provides advantages that include, but are not limited to: maintaining the same or similar mating side of a conventional connector to enable the electronic device to interface with the host device while increasing signal exchange capabilities; enabling a connector to be surface mounted to a printed circuit board of an electronic device; improving signal routing and placement compared to pin-based only connectors; increasing flexibility to add higher Peripheral Component Interconnect Express (PCIe) bus lanes within the electronic device for providing additional bandwidth; reducing issues associated with pin planarity implementations; and improving contact/signal quality from PCBs to other devices (e.g., host devices) while permitting user-design preferred method to route and/or group signal lanes in electronic devices.

These various benefits and examples will be described in greater detail below with reference to FIG. 1-FIG. 5.

FIG. 1 illustrates a conventional connector 100 that may be used to connect a data storage device to a host device. In an example, the connector 100 is a small form factor (SFF) connector. The connector 100 includes a mating side 110 and a termination side 120. The mating side 110 includes a plurality of gold finger contacts 130 and the termination side 120 includes a plurality of pins 140. The gold finger contacts 130 are used to interface with a slot or bus (e.g., a Peripheral Component Interconnect Express (PCIe) bus) on a motherboard of a host device. Additionally, the pins 140 are typically connected (e.g., soldered) to the printed circuit board of the data storage device. Various signals and/or commands may be exchanged between the host device and the data storage device via the connector 100.

However, as described above, it may be desirable to increase the number of signals and/or commands that are exchanged between the host device and the data storage device. In order to increase the number of signals exchanged, additional gold finger contacts 130 must be added to the connector 100. For each gold finger contact 130 that is added to the connector 100, an additional pin 140 will also need to be added to the connector 100. However, as additional pins 140 are added to the connector 100, the pins 140 need to be smaller, thinner, and/or need to be placed closer together. Smaller and thinner pins are more easily damaged and the risk of solder bridges forming between adjacent pins 140 significantly increases when pins 140 are placed close together.

Figure 2A:
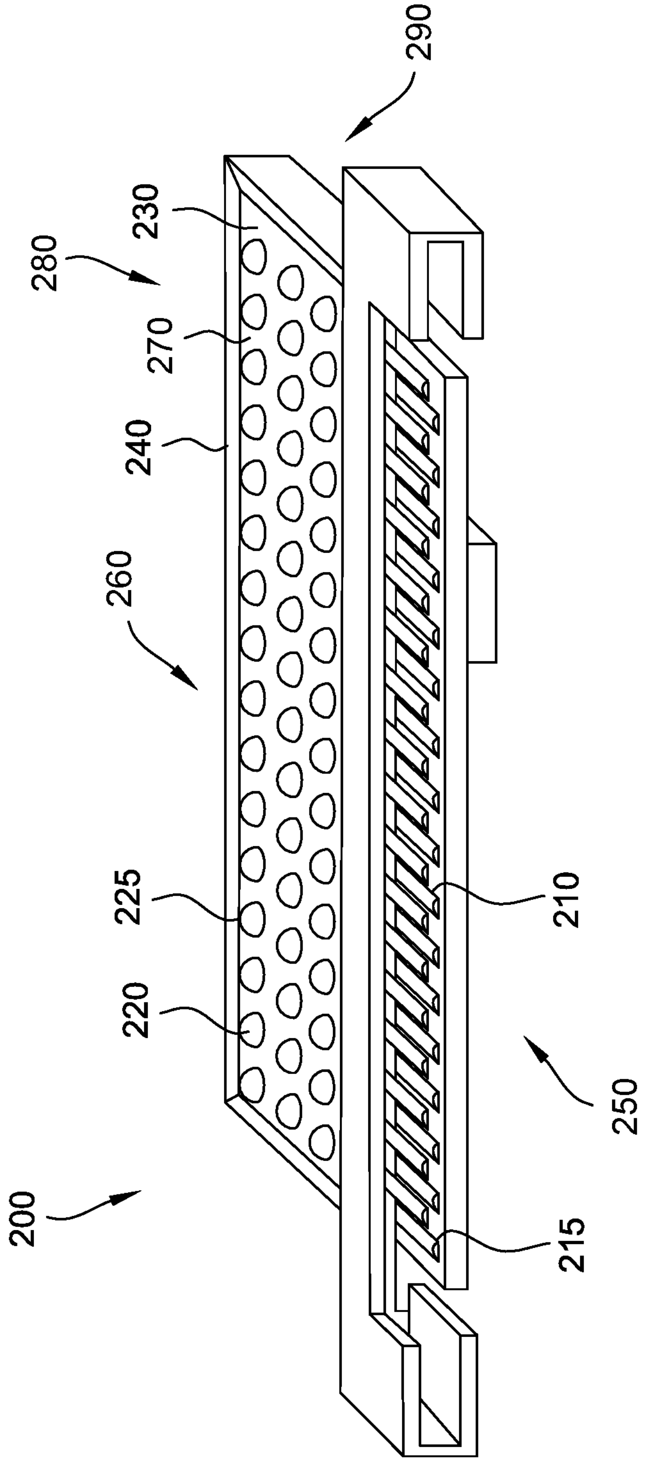
FIG. 2A illustrates a bottom view of a connector having a grid of connection points according to an example.

FIG. 2A illustrates a bottom view of a connector 200 according to an example of the present disclosure. In an example, the connector 200 is a small form factor (SFF)

connector that may be used to communicatively couple an electronic device, such as, for example, a data storage device to a host device. Although a data storage device is specifically mentioned, the connector 200 may be used to communicatively couple a number of different electronic device, computing components, and the like, to a host device. Additionally, although a SFF connector is specifically mentioned, the features described herein may be used in a number of different connectors that are used to connect an electronic device to a host device.

The connector 200 includes a mating side 250 and a termination side 260. The mating side 250 includes a number of different contacts 210. In an example, the contacts 210 are gold finger contacts although other types of contacts may be used. Each contact 210 may be responsible for communicating a signal or a type of signal between the electronic device and the host device.

In the example shown in FIG. 2A, the contacts 210 are provided on a male connector. In other examples, the contacts 210 may be provided on a female connector. The contacts 210 may be used to interface with a slot or bus (e.g., a Peripheral Component Interconnect Express (PCIe) bus) on a motherboard of the host device.

In some examples, the contacts 210 are positioned adjacent to one another. Although the contacts 210 are shown in a particular pattern/order, the contacts 210 may be arranged in any other suitable manner that allows the mating side 250 of the connector 200 to interface with a host device.

The termination side 260 includes a number of different connection points 220 arranged in grid having a number of rows and columns (e.g., a grid of connection points 230). In an example, each connection point 220 is a solder ball. As such, the grid of connection points 230 may be a ball grid array (BGA).

Each contact 210 is communicatively and/or electrically coupled to a particular connection point 220 in the grid of connection points 230. For example, a trace may be used to connect a first contact 215 to a first connection point 225 in the grid of connection points 230.

Because traces are used to connect the contacts 210 with the connection points 220, the contacts 210 may be communicatively coupled to any connection point 220 in the grid of connection points 230. For example, a first set of contacts 210 (e.g., the three leftmost contacts 210 shown in FIG. 2A) may be electrically coupled to respective connection points 220 in the last column (e.g., the rightmost column) of the grid of connection points 230.

In another example, each contact 210 may be electrically coupled to connection points 220 in a particular row and/or column based on the type of signal (e.g., power, ground, commands, data) and/or the type of connection (e.g., SATA, SAS) associated with the contact 210. Thus, signals of various types may be separated and/or grouped on a particular location/area of the grid of connection points 230.

The connector 200 includes or is otherwise associated with a printed circuit board 270 or other substrate. The printed circuit board 270 may include a top surface 290 and a bottom surface 280. The top surface 290 may be disposed or otherwise contained in a housing 240 of the connector 200. The bottom surface 280 of the printed circuit board 270 may be exposed.

Figure 5:
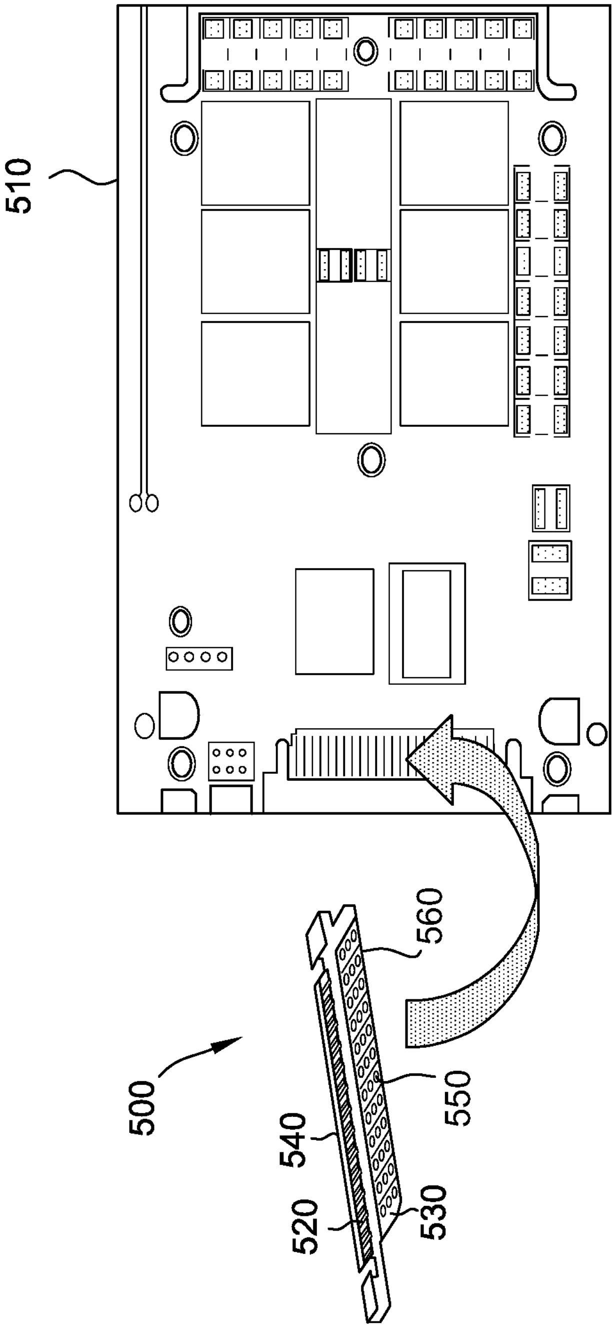
FIG. 5 illustrates a connector being surface mounted to a printed circuit board of an electronic device according to an example.

For example and as shown in FIG. 2A, the grid of connection points 230 is provided or otherwise disposed on the bottom surface 280 of the printed circuit board 270. As such, the termination side 260 of the connector 200 can be surface mounted to a printed circuit board of an electronic device (e.g., such as shown in FIG. 5). For example, each connection point 220 in the grid of connection points 230 may be communicatively and/or electrically coupled to respective pads (e.g., BGA pads) or other such connection points on a printed circuit board of a data storage device.

The housing 240 may also be used to protect the various traces that are used to electrically and/or communicatively couple the contacts 210 with the connection point 220. Additionally, the housing 240 may be used to protect a plurality of connection mechanisms (e.g., pins) disposed between the contacts 210 and the connection points 220.

Figure 2B:
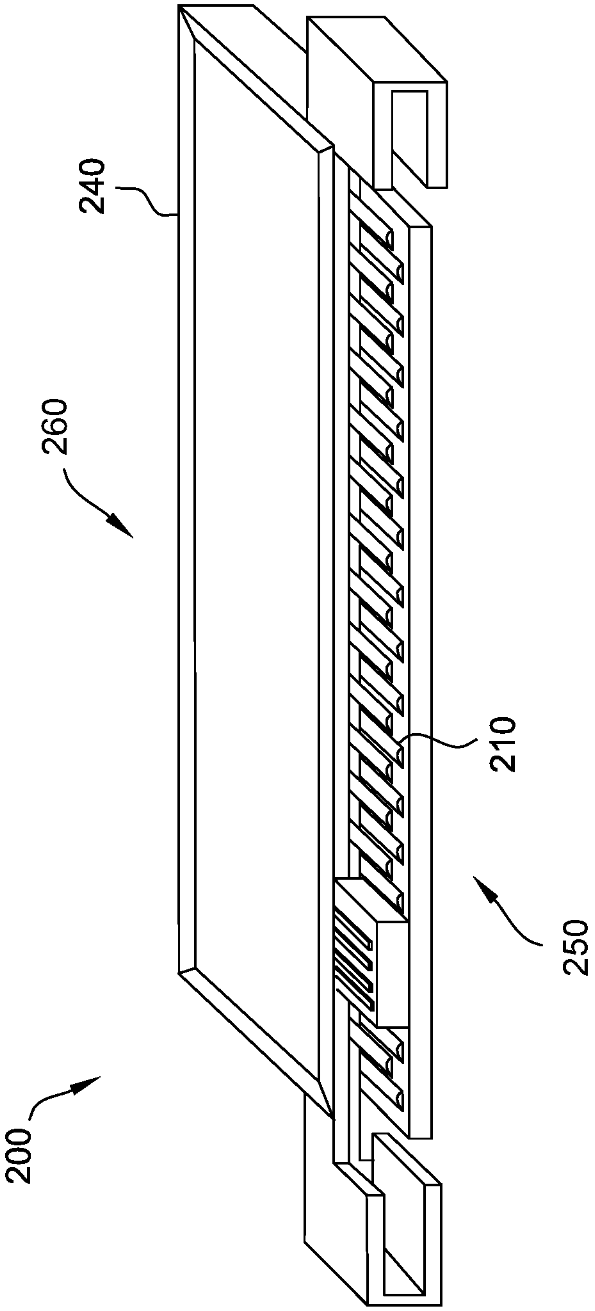
FIG. 2B illustrates a top view of the connector of FIG. 2A according to an example.

FIG. 2B illustrates a top view of the connector 200 of FIG. 2A according to an example. As previously described, the connector 200 includes a mating side 250 having a number of contacts 210 and a termination side 260. The termination side 260 may include the grid of connection points (e.g., grid of connection points 220 (FIG. 2A)) that enables the connector 200 to be surface mounted on a printed circuit board of an electronic device.

The termination side 260 may also include or otherwise be associated with a housing 240. The housing 240 may extend horizontally or vertically from the mating side 250 to the termination side 260. As will be explained in greater detail below, the housing 240 may be used to protect the traces and/or connection mechanisms of the connector 200 from being damaged.

Figure 2C:
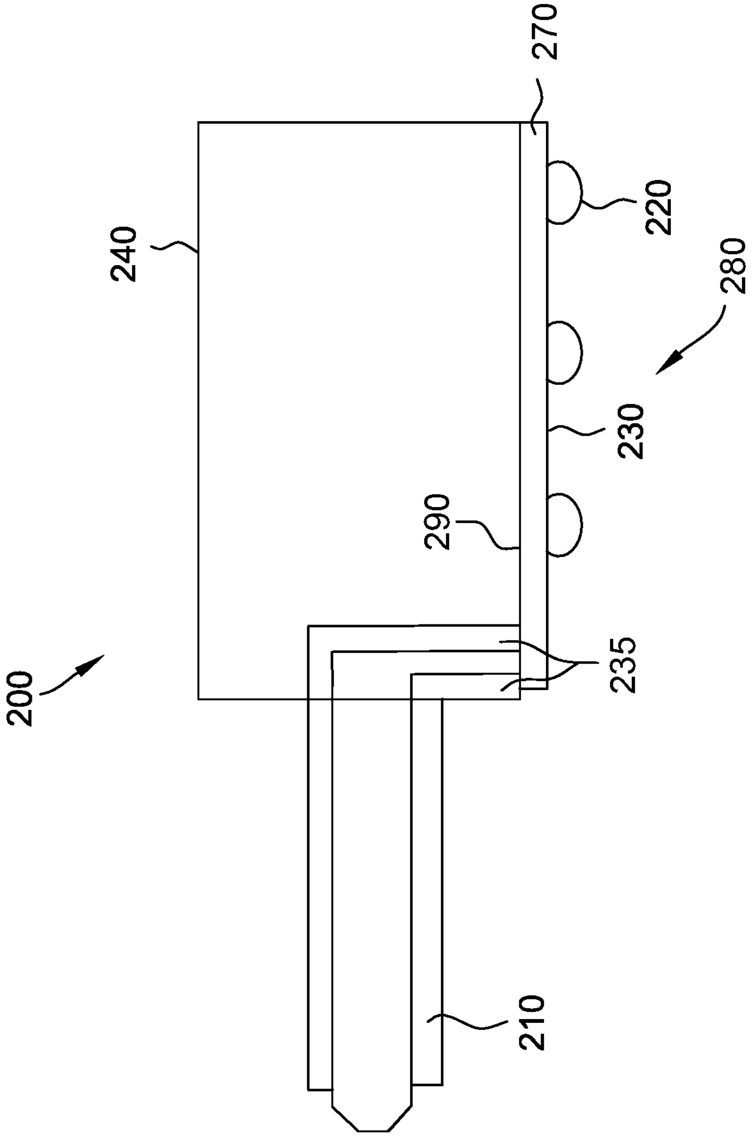
FIG. 2C illustrates a side view of the connector of FIG. 2A according to an example.

FIG. 2C illustrates a side view of the connector 200 of FIG. 2A according to an example. As shown in FIG. 2C, the connector 200 may include a number of connection mechanisms 235. The connection mechanisms 235 may be provided within the housing 240 and between the contacts 210 and the connection points 220. In an example, the connection mechanisms 235 are pins. The pins may be similar to the pins 140 shown and described with respect to FIG. 1.

In an example, a first end of the connection mechanism 235 is electrically and/or communicatively coupled to a respective contact 210 and a second end of the connection mechanism 235 is electrically and/or communicatively coupled to a trace. The trace may also be electrically and/or communicatively coupled to a connection point 220 in the grid of connection points 230. In another example, a connection mechanism 235 may be directly coupled to a particular connection point 220 in the grid of connection points 230. Because traces are used to connect the contacts 210 with the connection points 220, the contact may be connected to any connection point 220 in the grid of connection points 230.

As shown in FIG. 2C, the housing 240 includes the connection mechanisms 235, the traces, and the top surface 290 of the printed circuit board 270. However, the bottom surface 280 of the printed circuit board 270, along with the grid of connection points 230, remains exposed. As such, the connector 200 may be surface mounted on a printed circuit board of an electronic device such as previously described.

Figure 3A:
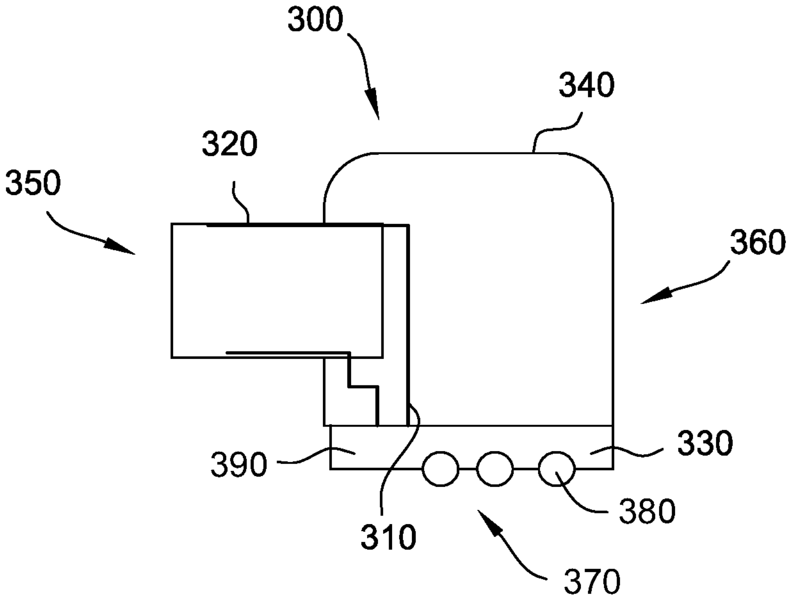
FIG. 3A is a side view of a connector in which one or more traces connect the contacts of the connector with respective connection points of a grid of connection points according to an example.

FIG. 3A is a side view of a connector 300 in which one or more traces 310 are used to connect a plurality of contacts 320 of the connector 300 with a grid of connection points 330 according to an example. The connector 300 may be similar to the connector 200 shown and described with respect to FIG. 2A-FIG. 2C. As such, the connector 300 includes contacts 320, a housing 340, a mating side 350, and a termination side 360.

The housing 340 includes a plurality of connection mechanisms (e.g., pins) disposed between the contacts 320 and the grid of connection points 330. In some examples, a connection mechanism is provided between each contact 320 and each connection point 380 in the grid of connection points 330. As explained above, the grid of connection points 330 is provided on a bottom surface 370 of the printed circuit board 390.

The traces 310 may be used to electrically couple each connection mechanism and/or each contact 320 to corresponding connection points 380 in the grid of connection points 330. Because the traces 310 are used to connect the contacts 320 with the connection points 380, a particular contact 320 may be connected to any location (e.g., connection point) in the grid of connection points 330.

In some examples, at least a portion of each trace 310 may be provided in and/or otherwise routed on the printed circuit board 390 on which the grid of connection points 330 is provided. In another example, the traces 310 may be etched and/or routed in/through another circuit board that is coupled to the printed circuit board 390.

Figure 3B:
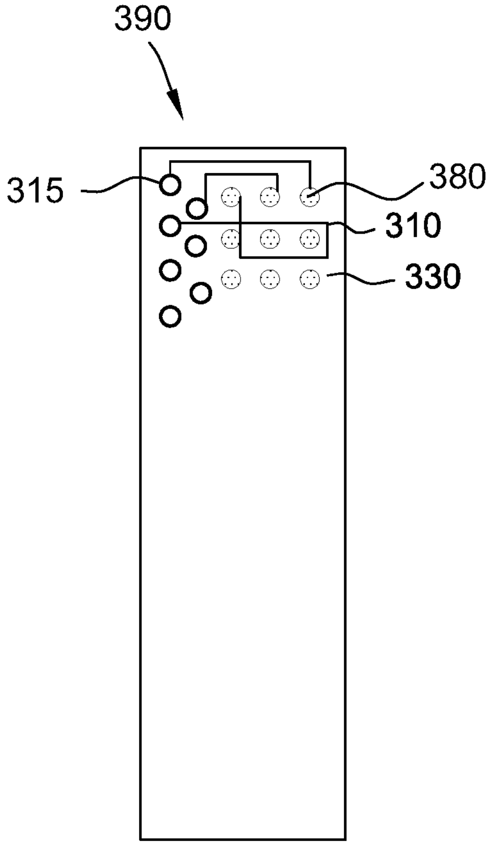
FIG. 3B is a top view of a printed circuit board in which one or more traces are routed through according to an example.

FIG. 3B is a top view of the printed circuit board 390 of FIG. 3A. The printed circuit board 390 includes the grid of connection points 330. As shown in FIG. 3A, the traces 310 may be etched in or otherwise provided on and/or routed through a surface of the printed circuit board 390. For example, a trace contact 315 may be electrically coupled to a first location on the printed circuit board 390. The traces 310 may then electrically couple the trace contact 315 to various connection points 380 in the grid of connection points 330.

Figure 4A:
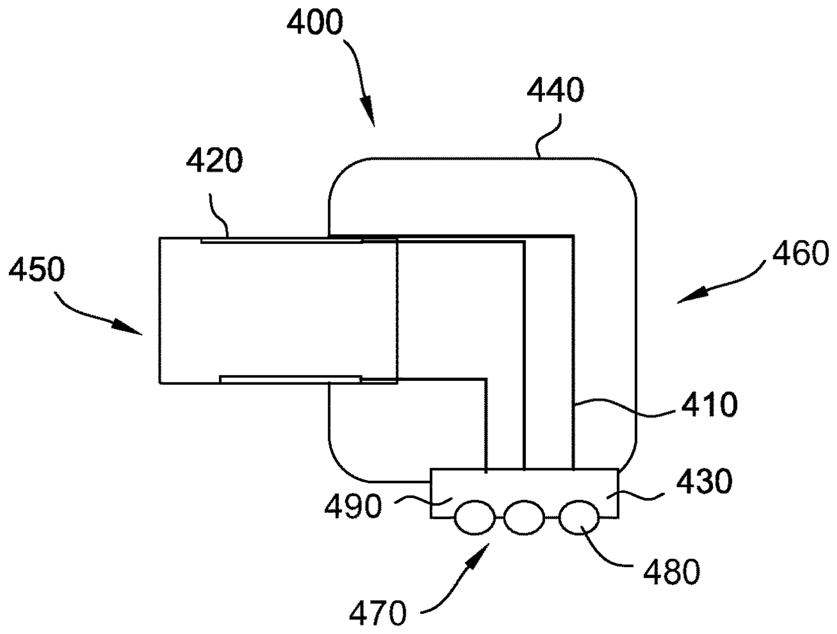
FIG. 4A is a side view of a connector in which one or more traces directly connect the contacts of the connector with respective connection points of a grid of connection points according to an example.

FIG. 4A is a side view of a connector 400 in which one or more traces 410 are used to directly connect the contacts 420 of the connector 400 with respective connection points in a grid of connection points 430 according to an example. The connector 400 may be similar to the connector 200 shown and described with respect to FIG. 2A-FIG. 2C. As such, the connector 400 includes contacts 420, a housing 440, a mating side 450, and a termination side 460.

The housing 440 may include a plurality of connection mechanisms (e.g., pins) disposed between the contacts 420 and the grid of connection points 430. The grid of connection points 430 is provided on a bottom surface 470 of the printed circuit board 490 such as previously described.

The printed circuit board 490 on which the grid of connection points 430 is placed may be at least partially contained in the housing 440. For example, an upper surface of the printed circuit board 490 may be contained within the housing 440 while the bottom surface 470 (e.g., the surface having the grid of connection points 430) is exposed.

The traces 410 may also be contained in the housing 440 and may be used to electrically couple each connection mechanism and/or each contact 420 to corresponding connection points 480 in the grid of connection points 430. In this example, each trace 410 may be directly coupled (e.g., using a via) to a particular connection point 480 in the grid of connection points 430.

Figure 4B:
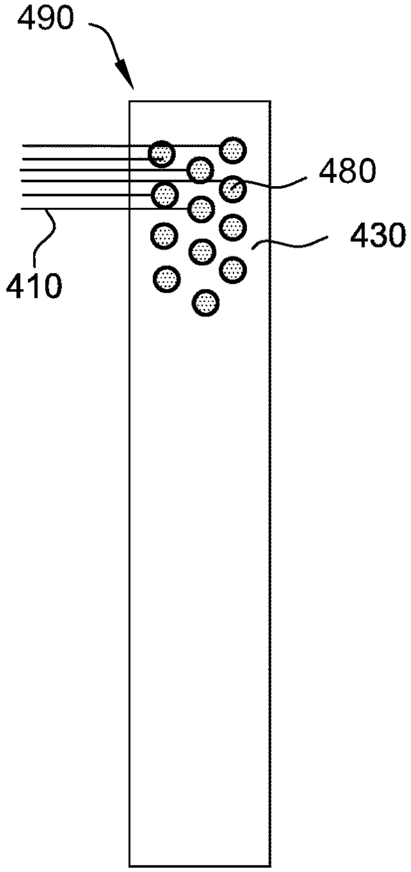
FIG. 4B is a top view of a printed circuit board in which the one or more traces of FIG. 4A are directly connected to respective connection points in the grid of connection points according to an example.

FIG. 4B is a top view of a printed circuit board 490 in which the one or more traces 410 are directly connected to particular connection points 480 in the grid of connection points 430 according to an example. For example, the printed circuit board 490 may include a via or other opening that enables a trace 410 to be directly coupled to at least a portion of the connection point 480.

FIG. 5 illustrates a connector 500 being surface mounted to a printed circuit board 510 of an electronic device according to an example. The connector 500 may be similar to the connector 200 shown and described with respect to FIG. 2A-FIG. 2C.

For example, the connector 500 may be a small form factor (SFF) connector or any other suitable type of connector to enable an electronic device, such as, for example, a data storage device, to be coupled to a host device. The connector 500 includes a plurality of contacts 520 provided on a mating side 540. The connector 500 also includes a grid of connection points 530 provided on a termination side 560.

As explained above, the grid of connection points 530 may be a ball grid array (BGA) that includes a number of connection points 550. The grid of connection points 530 enables the connector 500 to be surface mounted (e.g., horizontally or vertically depending on an orientation of the termination side 560) on corresponding pads or other connection points on the printed circuit board of the electronic device.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A connector for communicatively coupling an electronic device to a host device, the connector comprising:

a mating side comprising a plurality of contacts; and a termination side for surface mounting the connector to the electronic device, the termination side comprising:

a printed circuit board; and a grid of connection points provided on a bottom surface of the printed circuit board, the grid of connection points having a first area with a first subset of connection points and a second area with a second subset of connection points, wherein:

the first area with the first subset of connection points is associated with a first type of signal and the first subset of connection points are communicatively coupled to a first set of contacts of the plurality of contacts using a first set of traces provided, at least partially, on a top surface of the printed circuit board;

the second area with the second subset of connection points is associated with a second type of signal and the second subset of connection points are communicatively coupled to a second set of contacts of the plurality of contacts using a second set of traces provided, at least partially, on the top surface of the printed circuit board; and a housing enclosing the top surface of the printed circuit board, the first set of traces and the second set of traces thereby exposing the bottom surface of the printed circuit board and wherein the mating side and the plurality of contacts extend beyond the housing.

2. The connector of claim 1, wherein the grid of connections points is a ball grid array.

3. The connector of claim 1, wherein a first subset of the plurality of contacts are grouped in an area of the mating side of the connector based, at least in part, on the first type of signal.

4. The connector of claim 1, further comprising:

a first connection mechanism disposed between a first contact of the plurality of contacts and is communicatively coupled to a first connection point of the grid of connection points using a first trace of the first set of traces; and a second connection mechanism disposed between a second contact of the plurality of contacts and is communicatively coupled to a second connection point of the grid of connection points using a second trace of the second set of traces.

5. The connector of claim 4, wherein:

the first connection mechanism is a first pin; and the second connection mechanism is a second pin.

6. The connector of claim 5, wherein the first connection mechanism and the second connection mechanism are provided in the housing of the connector.

7. A connector for communicatively coupling an electronic device to a host device, comprising:

a mating side comprising a plurality of contacts; and a termination side for surface mounting the connector to the electronic device, the termination side, comprising:

a grid of connection points provided on a bottom surface of a printed circuit board;

a plurality of traces extending from the grid of connection points and extending, at least partially, along a top surface of the printed circuit board; and a plurality of contacts coupled to the plurality of traces such that a subset of contacts of the plurality of contacts are grouped in an area on the mating side of the connector and are coupled to a particular area in the grid of connection points based, at least in part, on a type of signal associated with the particular area.

8. The connector of claim 7, wherein the type of signal associated with the particular area is selected from a group comprising:

a power signal;

a control signal;

a ground signal; and a data signal.

9. The connector of claim 7, wherein the grid of connection points is a ball grid array.

10. The connector of claim 7, wherein each contact of the plurality of contacts is directly coupled to a connection point of the plurality of connection points using a trace of the plurality of traces.

11. The connector of claim 7, wherein the mating side extends beyond a housing of the connector.

12. The connector of claim 7, further comprising a plurality of connection mechanisms provided between each contact of the plurality of contacts and the grid of connection points.

13. The connector of claim 12, wherein each of the plurality of connection mechanisms is a pin.

14. The connector of claim 12, wherein the plurality of connection mechanisms are provided in a housing of the connector.

15. A connector for communicatively coupling an electronic device to a host device, comprising:

a mating side comprising a plurality of contact means; and a termination side for surface mounting the connector to the electronic device, the termination side, comprising:

a grid of connection means provided on a bottom surface of a printed circuit board, the grid of connection means having a first area with a first subset of connection means and a second area with a second subset of connection means, wherein:

the first area with the first subset of connection means is associated with a first type of signal and the first subset of connection means are communicatively coupled to a first set of contact means of the plurality of contact means using a first set of communication means provided, at least partially, on a top surface of the printed circuit board;

the second area with the second subset of connection means is associated with a second type of signal and the second subset of connection means are communicatively coupled to a second set of contact means of the plurality of contact means using a second set of communication means provided, at least partially, on the top surface of the printed circuit board; and an enclosure means at least partially surrounding the top surface of the printed circuit board, the first set of communication means and the second set of communication means thereby exposing the bottom surface of the printed circuit board and wherein the mating side and the plurality of contact means extend beyond the enclosure means.

16. The connector of claim 15, wherein the plurality of contact means are gold finger contacts.

17. The connector of claim 15, wherein the grid of connection means is a ball grid array.

18. The connector of claim 15, wherein at least a subset of the first set of contact means of the plurality of contact means are grouped in an area of the mating side of the connector based, at least in part, on the first type of signal.

19. The connector of claim 15, wherein the enclosure means at least partially surrounds a coupling means that communicatively couples each of the plurality of contact means to respective connection means in the grid of connection means.

20. The connector of claim 19, wherein the coupling means is a pin.

* * * * *